United States Patent
Singh

(10) Patent No.: US 10,124,305 B2
(45) Date of Patent: Nov. 13, 2018

(54) AGITATION DEVICE FOR RED WINE PRODUCTION

(71) Applicant: Vijay Singh, Far Hills, NJ (US)

(72) Inventor: Vijay Singh, Far Hills, NJ (US)

(*) Notice: Subject to any disclaimer, the term of this patent is extended or adjusted under 35 U.S.C. 154(b) by 333 days.

(21) Appl. No.: 15/013,395

(22) Filed: Feb. 2, 2016

(65) Prior Publication Data

US 2017/0216795 A1    Aug. 3, 2017

(51) Int. Cl.
| *B01F 13/00* | (2006.01) |
| *C12G 1/02* | (2006.01) |
| *B01F 7/00* | (2006.01) |

(52) U.S. Cl.
CPC ........ *B01F 13/0049* (2013.01); *B01F 7/0095* (2013.01); *B01F 7/00733* (2013.01); *C12G 1/02* (2013.01)

(58) Field of Classification Search
CPC ..... C12G 1/02; B01F 13/0032; B01F 13/0049
USPC .................................................. 366/142, 601
See application file for complete search history.

(56) References Cited

U.S. PATENT DOCUMENTS

| 4,164,902 A | 8/1979 | Maarleveld |
| 4,474,890 A | 10/1984 | Rieger |
| 4,517,884 A | 5/1985 | Jandrich |
| 4,593,612 A | 6/1986 | Rieger |
| 4,969,391 A | 11/1990 | Haulot |
| 6,279,457 B1 | 8/2001 | Francia |
| 6,631,732 B1 | 10/2003 | Koster et al. |
| 6,703,055 B1 | 3/2004 | Klein et al. |
| 6,805,885 B2 | 10/2004 | Francia |
| 7,552,675 B2 | 6/2009 | Lorincz |
| 7,891,291 B2 | 2/2011 | Lorincz |
| 8,015,915 B2 | 9/2011 | Poissant |
| 9,145,538 B2* | 9/2015 | Loos .................. B01F 11/0082 |
| 2001/0042443 A1 | 11/2001 | Francia |
| 2003/0145735 A9 | 8/2003 | Francia |
| 2004/0076712 A1 | 4/2004 | Rodgers et al. |
| 2004/0149422 A1* | 8/2004 | Jungwirth ............ C12G 1/0213 165/47 |
| 2006/0156929 A1* | 7/2006 | Nelson ..................... C12G 1/02 99/348 |
| 2007/0255623 A1* | 11/2007 | Firer ...................... G06Q 30/00 705/15 |
| 2008/0102160 A1 | 5/2008 | Snell et al. |
| 2008/0145479 A1 | 6/2008 | Poissant |
| 2013/0238145 A1* | 9/2013 | Hammer ............. G01F 23/0023 700/279 |
| 2014/0203184 A1* | 7/2014 | Purdy .................... G01N 33/18 250/393 |

FOREIGN PATENT DOCUMENTS

| CN | 202246629 U | 5/2012 |
| EP | 0337060 A1 | 10/1989 |

* cited by examiner

*Primary Examiner* — David L Sorkin
(74) *Attorney, Agent, or Firm* — Barnes & Thornburg LLP

(57) ABSTRACT

An agitation device used in the production of red wine that breaks the cap during fermentation is provided. The device has a body, a depth sensor and a flotation device secured to the exterior of the body. Holes in the body enable the body to submerge into wine in a vessel below the surface. A control system is coupled to the agitator and inflates the inflation device to move the device to the surface of the wine to break through a fermentation cap formed on the surface of the wine.

16 Claims, 8 Drawing Sheets

AGITATION DEVICE FOR RED WINE PRODUCTION

BACKGROUND

The presently disclosed embodiments relate generally to agitation devices and methods for the making of wine.

In the fermentation of red wine, carbon dioxide gas is generated, and this causes the grape skins present in the fermentation to float up to the top of the liquid in the fermenter and form what is termed a "cap." During fermentation, this cap must be periodically broken up so that the skins are mixed into the liquid in order to most effectively extract color and flavor compounds from the skins and seeds. The cap must also be kept moist to prevent the growth of deleterious aerobic bacteria.

Conventionally, the agitation of the cap is performed by poking the cap with a pole to break it up. This tedious process is termed "punch down" and must be performed several times a day. Conventional punchdown techniques require an open top fermentation vessel. These open top fermenters permit air to contact the fermenting wine causing unwanted oxidation.

Although automated punchdown devices are commercially available, such devices are both mechanically complex, and require a moving seal to prevent contaminating the fermenting wine. Alternatively, other conventional methods for performing automated punchdown include pumping the liquid taken from the bottom of the fermenter over the cap to moisten it; however, although this conventional technique is widely used, it is ineffective in breaking up the cap.

Other techniques for "cap management" include using horizontally rotating fermenters (Rieger, U.S. Pat. No. 4,474,890 and Speidel, EP 0337060) that force the cap into the liquid. Such devices, however, are expensive and complex machines with large rotating assemblies, making them impractical for most wineries. Klein et. al. (U.S. Pat. No. 6,703,055) describes a fermentation tank with rotating mechanical agitators to flood the cap when needed.

SUMMARY

Disclosed embodiments provide a device that performs cap management using an inexpensive, automated device that can be easily retrofitted into a tank or bin used for wine fermentation so as to eliminate the need for tedious and dangerous hand "punching" and also improve quality by ensuring consistent cap management.

In accordance with at least one disclosed embodiment, the cap is agitated from underneath which is effective at both breaking up and wetting the cap without manual intervention.

In accordance with at least one embodiment, a device is provided for installation in a cylindrical tank or cubic bin ranging in volume from 20 to 5000 gallons and being made of a variety of materials ranging from plastic, wood, concrete, and stainless steel.

In accordance with at least one embodiment, the device is installed in an open top or closed top tank or bin with an access manway.

In accordance with at least one embodiment, the device consists of a stainless steel cylinder with a rubber pneumatic flotation collar and a thruster. The tether may also provide electric power and compressed air to the device. A depth sensor in the device may measure the submerged depth and activate air to inflate the flotation collar when a preset depth is reached.

In a disclosed embodiment of a method of operation, the agitation device may be dropped into the fermenting liquid and tethered to a control unit located outside the fermentation tank. The device may rapidly fill with fermenting wine and sink down below the cap. A depth sensor in the device may measure the submerged depth and activates air to inflate the flotation collar when a preset depth is reached. At periodic intervals, the flotation collar may be inflated completely and the device surfaces up through the cap, thereby causing the cap to break up.

Wine may be carried up from under the cap in the device and discharged on top of the cap, thoroughly wetting the dispersed cap. The thruster located on the bottom surface of the device may then be activated and the device propelled along the surface breaking up more of the cap in the manner of an ice-breaker. After a period of time, the inflation collar may be deflated, the device may fill up with wine and the device may submerge back down to a preset depth. After another preset period of time, the inflation collar may be re-inflated and the device may resurface in a different spot breaking up the cap there and wetting it with the wine transported from below the cap. This submerging/surfacing cycle may be repeated over and over again, causing the device to move randomly across the entire surface thereby effectively and automatically breaking up and wetting the entire cap surface.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
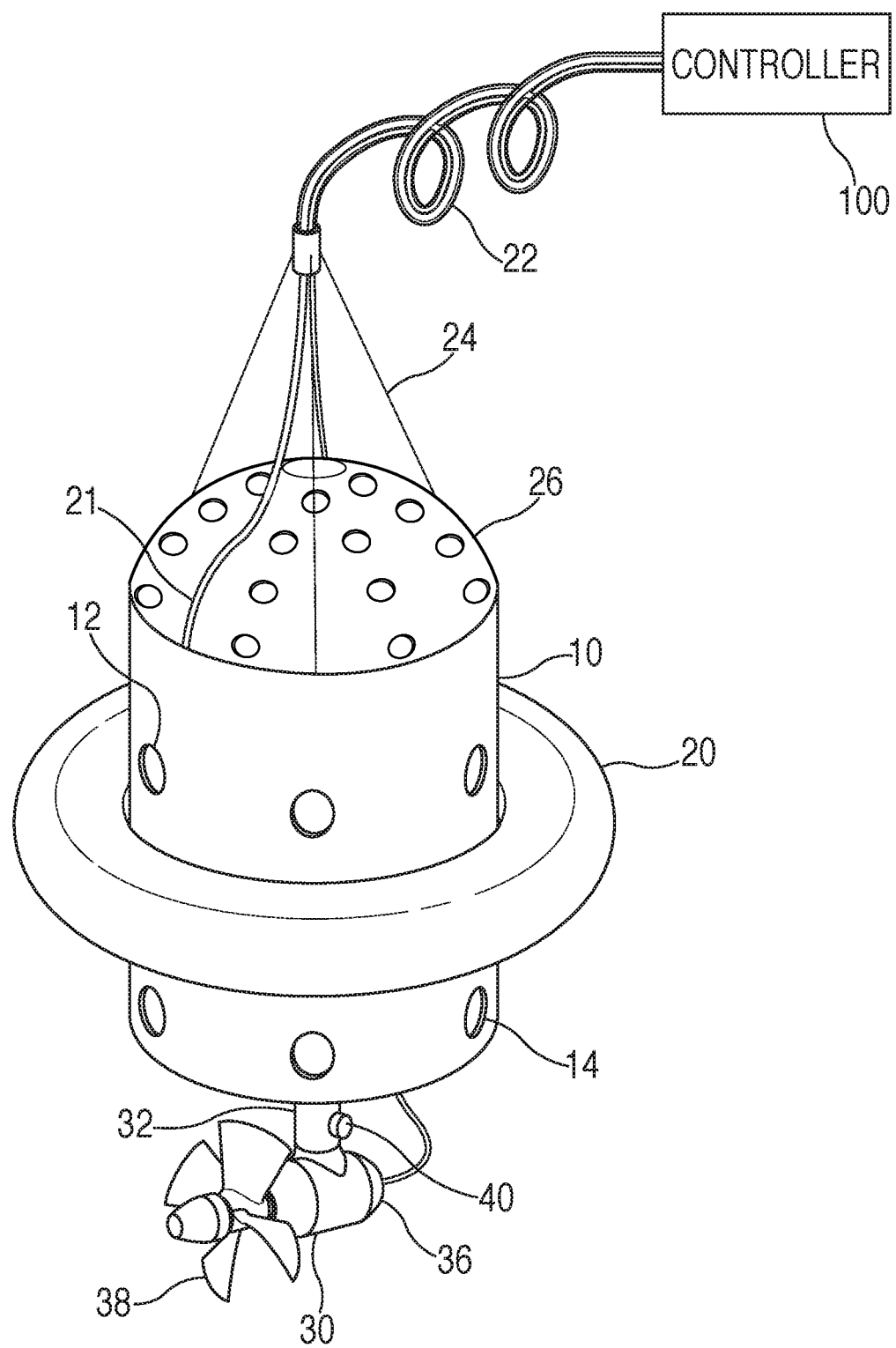
FIG. 1 is a perspective view of an agitation device illustrating a cylindrical vessel, flotation collar, and thruster in accordance with a disclosed embodiment.

In the following description, similar features in the drawings have been given identical reference numerals where appropriate. All dimensions and geometrical features are not to scale and are intended solely to illustrate an embodiment.

As discussed above, conventional cap punchdown methods are based on pushing the buoyant cap down into the liquid. However, the problem with this approach is that the cap rapidly rises back up. Very little of the cap breaks up in this process and the punchdown must be repeated many times a day and in different sections of the fermentation vessel.

Nevertheless, cap management is a critical factor in red wine production and has a tremendous impact on the color and flavor, and thereby determines the value of the resulting red wine. Thus, there is a need for an inexpensive automated device that can be easily retrofitted into the millions of tanks and bins used for red wine fermentation worldwide. Such an approach would eliminate the tedious and dangerous hand "punching" and also improve quality by ensuring consistent cap management.

The disclosed agitation device overcomes all limitations of prior art by attacking the cap from underneath. This radically different idea, not taught in any prior art, is effective at both breaking up and wetting the cap. It is automated and requires no manual intervention. It is inexpensive, and can be retrofitted in any open top or closed wine fermentation vessel.

According to one disclosed embodiment, a device is provided that can be installed in any standard wine fermentation vessel. These are typically cylindrical tanks or cubic bins. They range in volume from 20 to 5000 gallons and are made of a variety of materials ranging from plastic, wood, concrete, and stainless steel. They can be open at the top or closed with an access manway. The agitation device agitates the cap of skins and seeds that forms on the surface of the liquid during the course of red wine fermentation. The cap is broken up and moistened to extract color and flavor and to prevent contamination. The device performs this agitation automatically without any manual intervention and is capable of breaking up the cap across the entire surface of the fermentation.

According to another aspect, the device consists of a stainless steel cylinder with a rubber pneumatic flotation collar and a thruster. The tether may also provide electric power and compressed air to the device. A depth sensor in the device may measure the submerged depth and activate air to inflate the flotation collar when a preset depth is reached.

With this understanding of the technical utility and functionality in mind, Applicant now provided a detailed explanation of the disclosed embodiments with reference to the figures.

Referring to FIG. 1, an agitation device 5 may be provided with a body 10 having an open top and a closed base, a flotation device 20 and a thruster 30. As illustrated, the body 10 may be cylindrical, but may be, alternatively, other shapes having an open top and closed base. A plurality of upper holes 12 may be arranged around the top half of the body 10. An additional plurality of lower holes 14 may be provided in cylindrical body 10 to allow wine to fill and drain from the interior of the body 10. An airline 21 may be connected to an inlet fitting on the flotation device 20 and may extend through flexible tubing 22 to a controller 100. Support wire 24 may support the weight of the body 10 and provide stress relief for the tubing 22. A removable perforated lid 26 may be provided and coupled to the cylindrical body 10 to prevent whole grapes and other large debris from entering the cylindrical body 10.

In at least some embodiments, the flotation device 20 may be a toroidal rubber bladder attached near the mid-point of the cylindrical body 10, which separates the upper holes 12 and lower holes 14. This attached airline 21 may enable air to be introduced and removed from the flotation device 20 causing the bladder to inflate and deflate as needed.

The thruster 30 may be attached to the bottom of body 10 using a pylon 32. According to at least one embodiment, the thruster 30 may be implemented using a submersible electric motor 36 coupled to a propeller 38. In accordance with at least one other embodiment, the thruster 30 may be implemented using a submersible electric motor coupled to a propeller or a jet (not shown). In another embodiment, the thruster may be implemented using a rotating horizontal Archemedes screw (not shown). In still other embodiments, the agitation device may be implemented without a thruster but still break the cap through repeated submersions and emersions of the device.

A depth sensor 40 may be located in pylon 32 and be coupled to the controller 100 via flexible tubing 22. In an exemplary embodiment, the depth sensor 40 may be implemented using a MS5803-14BA (Measurement Specialities, Fairfield N.J.) model, sealed, absolute pressure sensor calibrated to provide liquid depth measurements.

Figure 2:
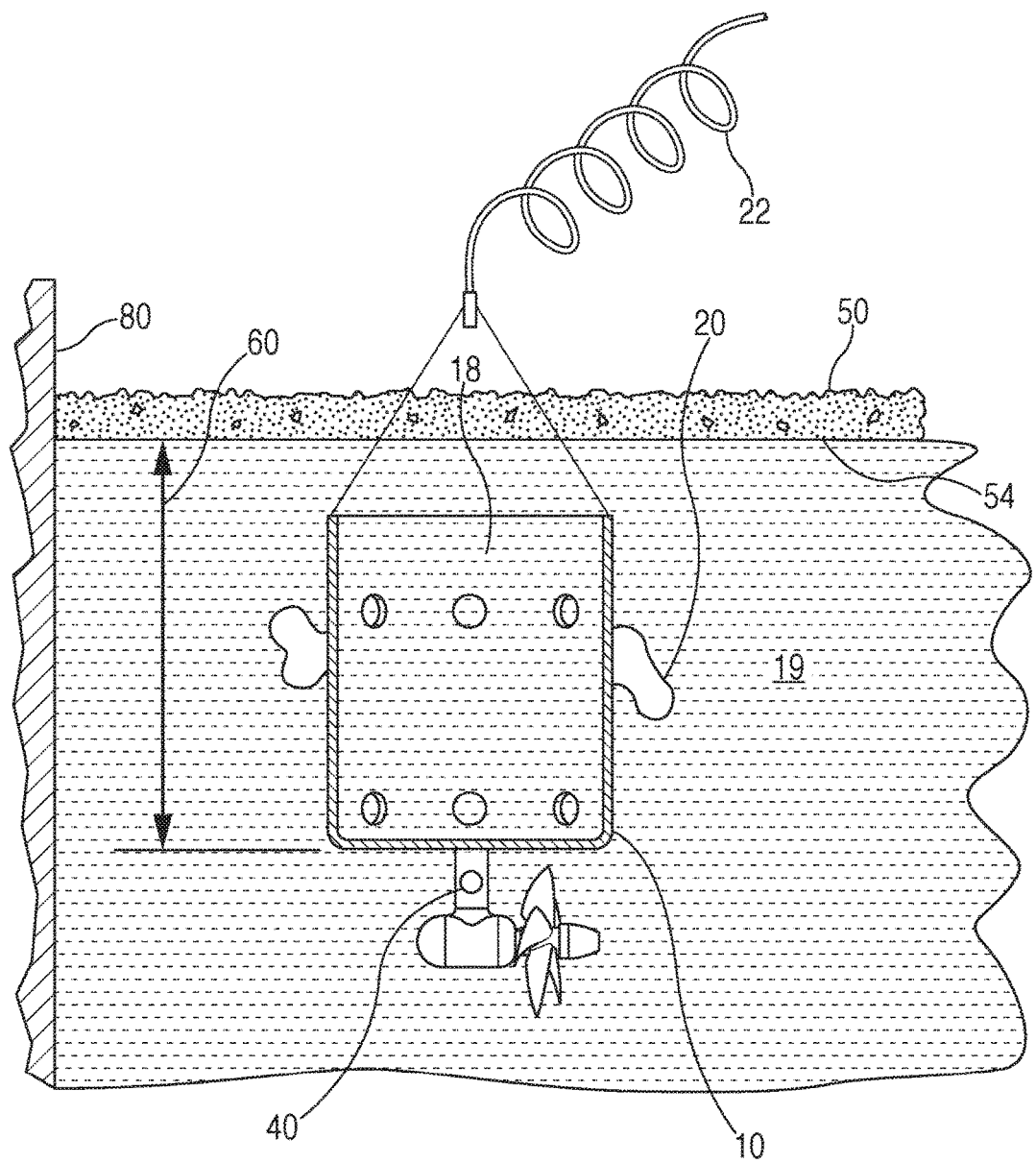
FIG. 2 is a side sectional view of the device illustrating the device neutrally buoyant at a preset depth below the surface in accordance with a disclosed embodiment.

FIGS. 2-6 illustrate a surfacing/submerging cycle of the agitation device 5 during cap agitation. FIG. 2 illustrates the device at the neutral buoyancy position stage, or the resting position in wine 19 in a vessel 80. Flexible tubing 22 extends to the exterior of the vessel to connect to the controller 100 shown in FIG. 1. Bladder 20 may be inflated just enough to maintain the device at a preset depth 60, for example, 60 cm below the liquid surface 54 and the cap 50 floating above the liquid surface 54. This position can be maintained by a feedback signal from the depth sensor 40 as explained in greater detail with respect to FIG. 7. By partially inflating the bladder 20, the device 5 can maintain neutral buoyancy at this preset depth. In the neutral position, the interior 18 of body 10 may be full of wine 19.

Figure 3:
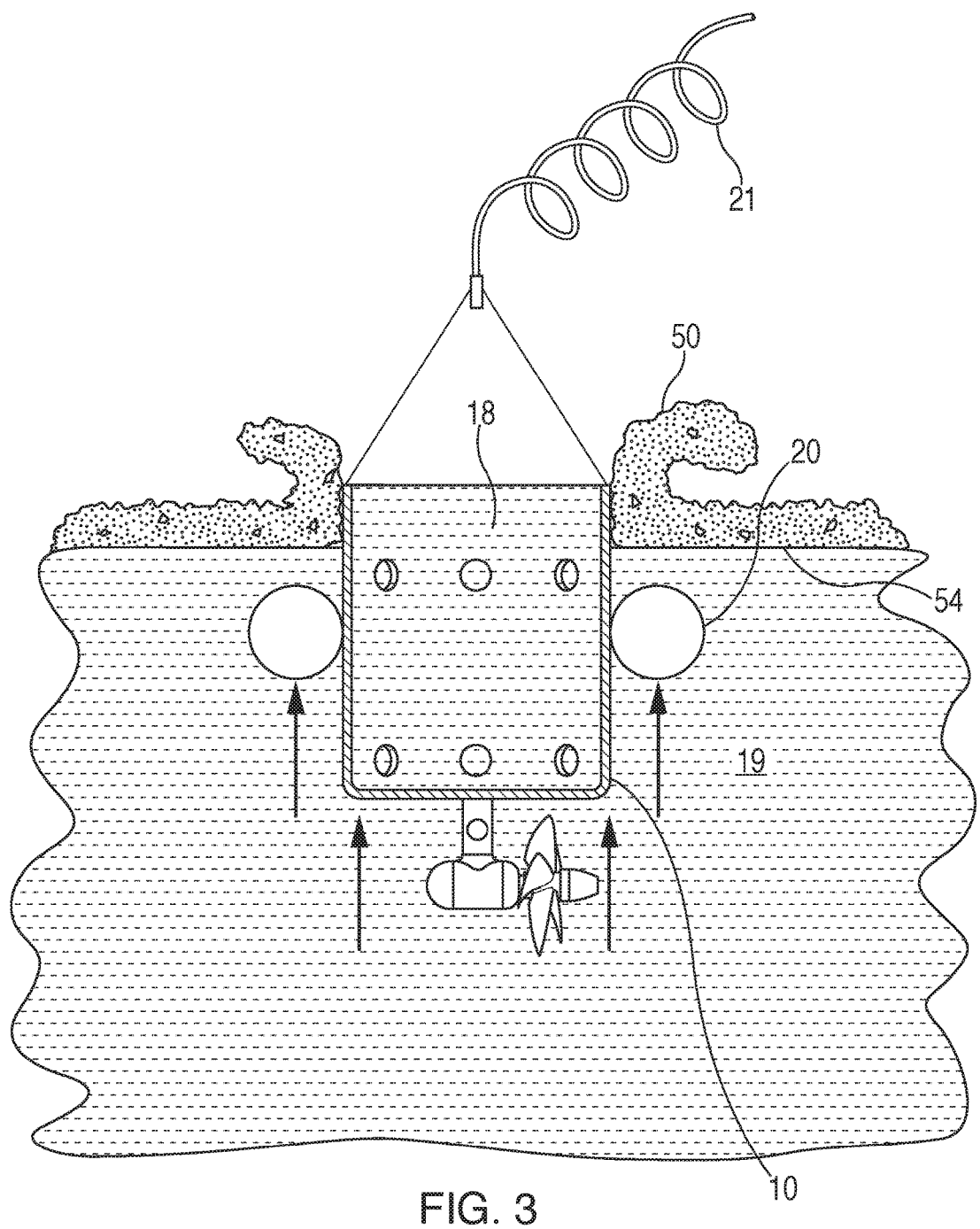
FIG. 3 is a side sectional view of the device illustrating the device breaking up through the cap at the surface in accordance with a disclosed embodiment.

FIG. 3 illustrates the device 5 during a surfacing stage. As can be seen, the device 5 may rise up through and break up the cap 54. Bladder 20 may be inflated by introducing pressurized air through airline 21 so that there is more air in the bladder 20 than the amount of air that exists in the bladder 20 in the neutral position in FIG. 2. As a result of the introduced pressurized air, the device 5 may rise upwards. The cap 54 may then be pushed aside and broken up as the device rises. At this stage, the interior 18 of the body 10 is now full of wine 19 which filled the body 10 when the body 10 was submerged.

Figure 4:
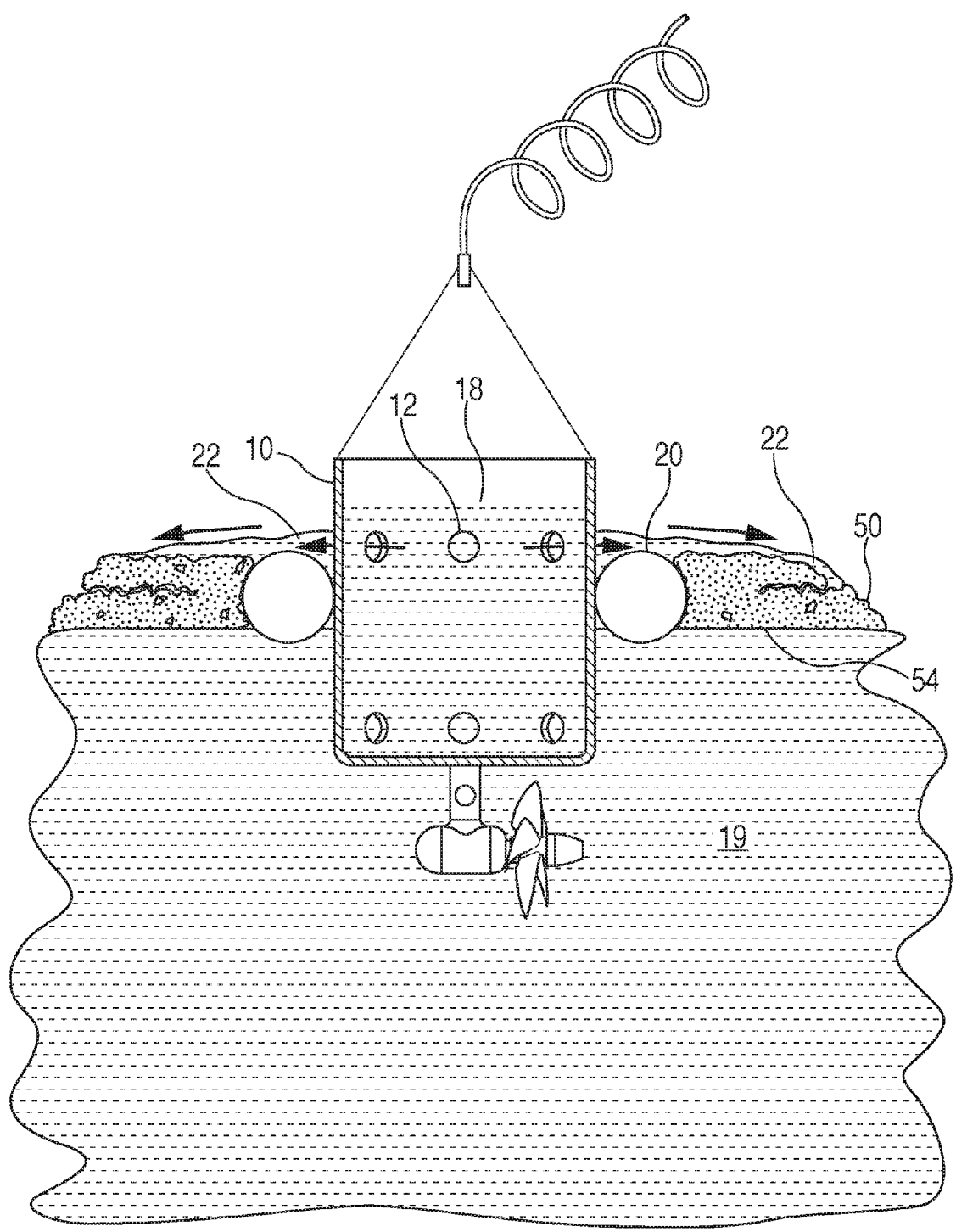
FIG. 4 is a side sectional view of the device showing wine being transported up and discharged out of the device onto the upper surface of the dispersed cap in accordance with a disclosed embodiment.

FIG. 4 illustrates the device 5 at a surfaced position stage, floating on the liquid surface 54 having displaced the cap 50. At this stage, the bladder 20 may be fully inflated and the body 10 may float on the wine liquid surface 54. Wine 22 inside the can 10 may now flow out of holes 12 over the bladder 20 and on to the surface of the dispersed cap 50. This wetting stage may continue until the wine 18 inside the can is depleted down to the level of bottom of the upper holes 12.

Figure 5:
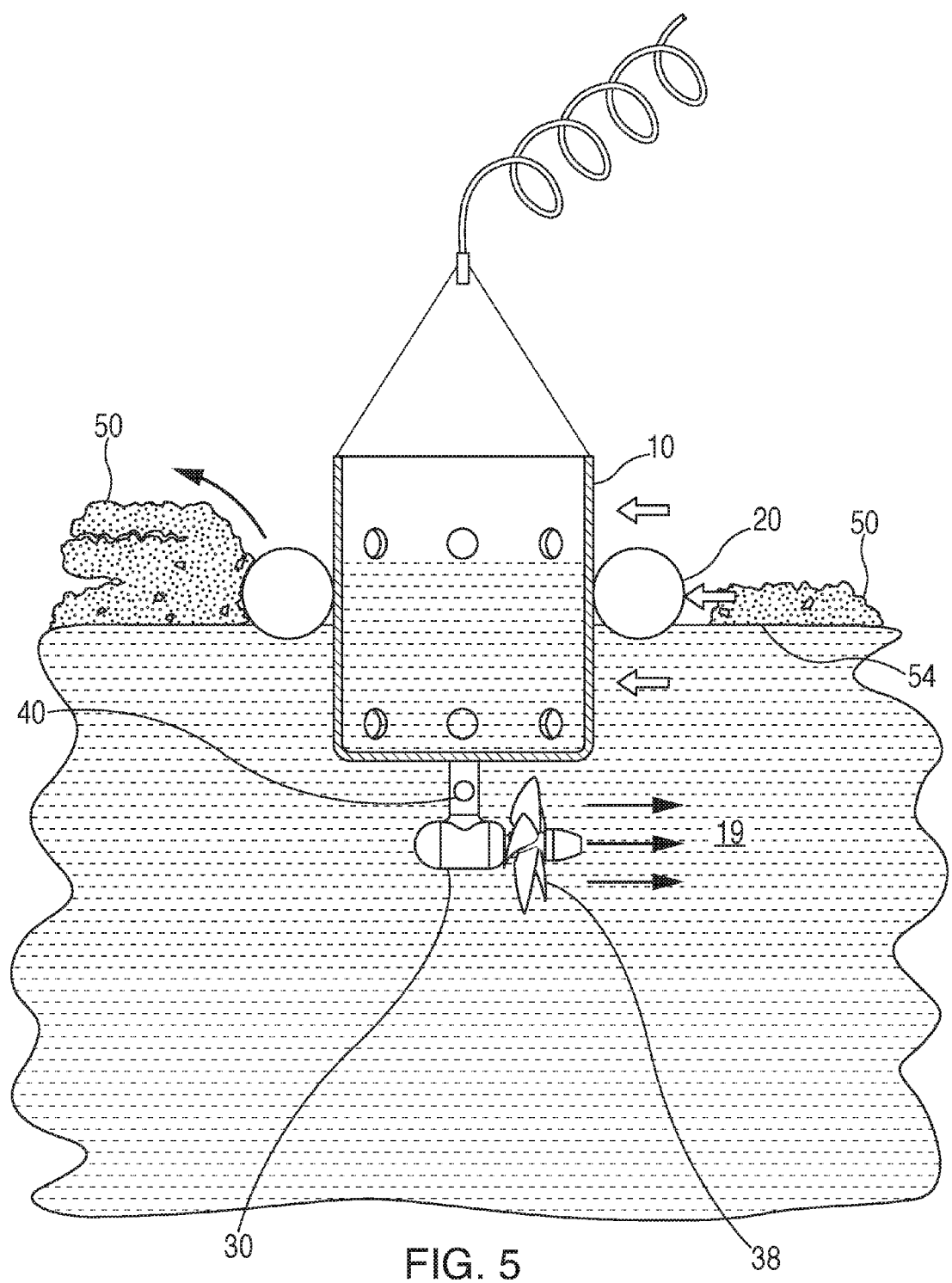
FIG. 5 is a side sectional view of the device being propelled by the thruster across the cap surface in accordance with a disclosed embodiment.
Figure 6:
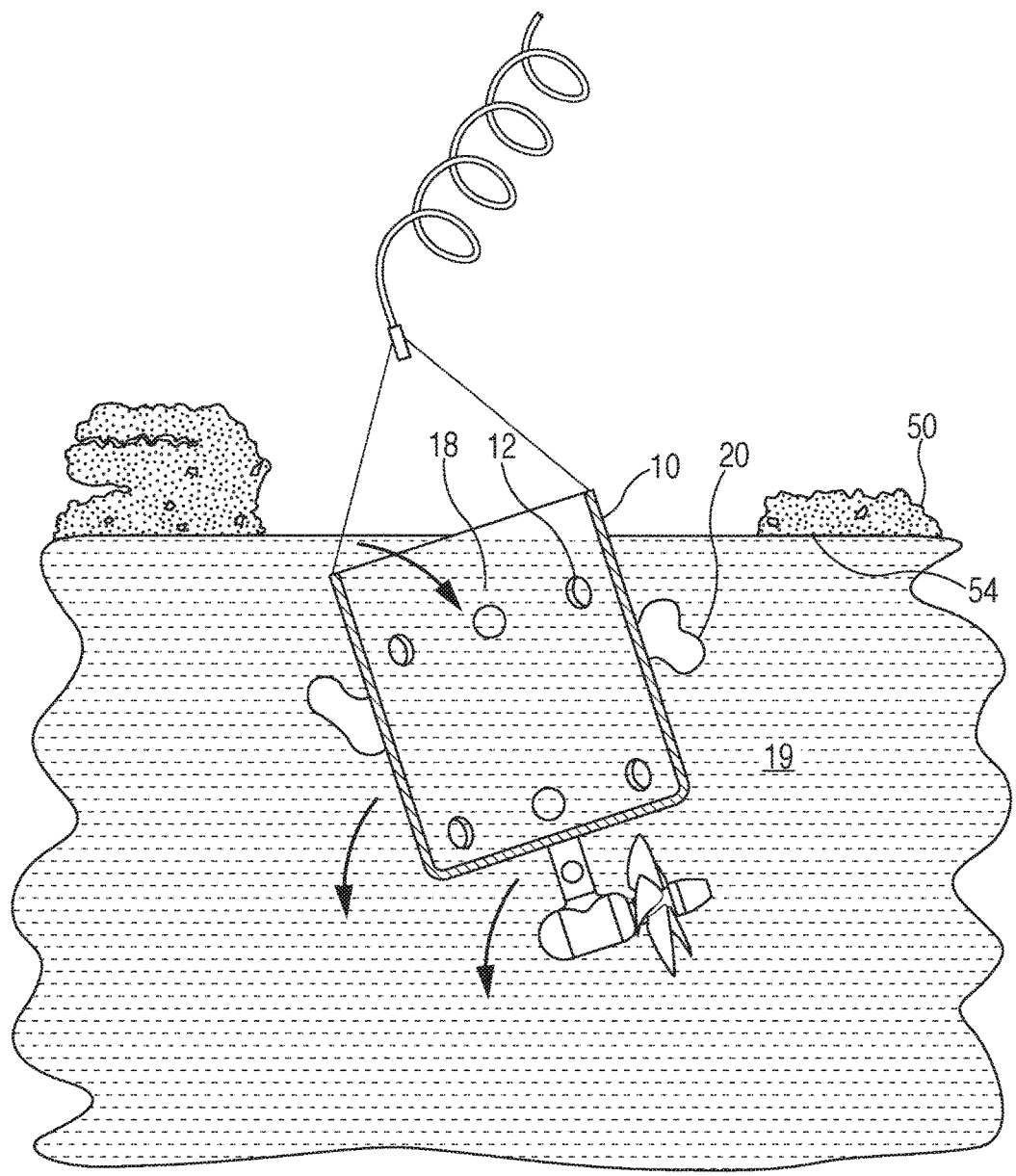
FIG. 6 is a side sectional view of the device illustrating starting to submerge in preparation for the next cycle in accordance with a disclosed embodiment.

FIG. 5 illustrates a stage that includes lateral surface movement of the device 5. This operational stage may occur after the wine 18 in the can 10 has been depleted to the level of the upper holes 12 as described in the previous paragraph. The bladder 20 may remain fully inflated to ensure that can 10 floats on the liquid surface 54, and the thruster 30 may be automatically energized in response. The activation of the thruster 30 may be automatically initiated in response to a predetermined depth sensed by depth sensor 40 or by a predetermined time elapsing after the bladder 20 has been fully inflated. The thrust from the rotating propeller 38 may cause the device to move laterally across the wine surface 54 dispersing the cap 50 in its path. Depending on the orientation of body 10, the direction may be random.

Figure 7:
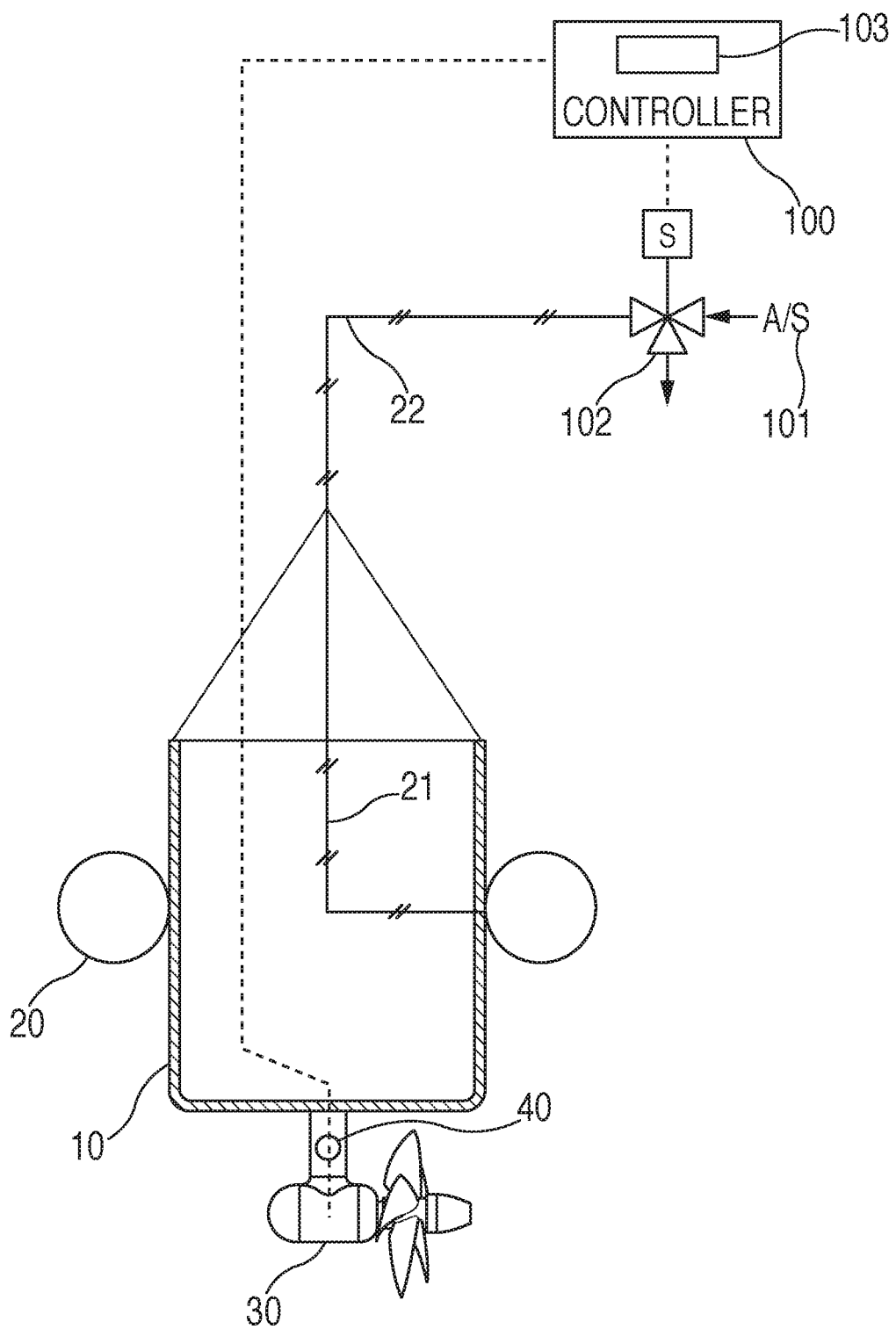
FIG. 7 is a schematic of a control mechanism for the device in accordance with a disclosed embodiment.

After a predetermined time, typically a few seconds of travel, bladder 20 may be deflated by energizing solenoid valve 102 (FIG. 7). The thruster 30 may be switched off and the device may start to submerge in the submersion stage shown in FIG. 6. Wine may enter the body 10 through holes 12 and completely fills the interior 18. Once the device reaches the preset depth, sensor 40 may again modulates solenoid valve 102 to maintain this depth. This is the resting, or neutral, situation as described earlier referring to FIG. 2.

At periodic intervals (for example, every 15 minutes) the surfacing/submerging cycle may be initiated and the device rise up as described in relation to FIG. 3 explained above. This cycle may repeat until the fermentation is completed (for example, 7 to 21 days). In this manner, the cap may be continually dispersed and wetted without any manual intervention by a user. Random movement of the device by propulsion from the thruster 30 may ensure that, over time, the device will disperse the cap over the entire surface of the fermentation.

FIG. 7 illustrates the control mechanism for implementing the surfacing/submerging cycle of the device. The control mechanism may include a controller 100 in electrical connection with the depth sensor 40, thruster 30 and solenoid valve 102. In an exemplary embodiment, the controller 100 may be a processor implemented in whole or in part using an Application Specific Integrated Circuit (ASIC) and may include a user interface 103, having a display and buttons or other user input mechanisms, to enable the settings for the surfacing/submerging cycle to be customized. For example, the predetermined depth for neutral resting and to start the surfacing, the periodic interval for the surfacing/submerging cycle, and the amount of time the device moves laterally along the surface to break the cap may all be preset and/or may be adjusted by a user, for example, the neutral resting position may be preset to 1-2 feet below the surface so as to be located under the cap or altered to be appropriate for the size of the container in which the device is deployed.

A single controller 100 may also be used to uniquely customize a single or a plurality of agitation devices 5, which may be in a plurality of different fermentation vessels. The solenoid valve 102 may be de-energized communicate compressed air from an air source 101 through airline 21 to flotation device bladder 20 during inflation. In another configuration, the valve 102 may be energized to vent air out of the bladder 20 to the atmosphere, allowing deflation of the bladder 20. The controller 100 may de-energize the solenoid valve 102 to cause the device 5 to surface based on a feedback signal from the depth sensor 40 that the device is at a predefined depth.

In at least one implementation of the above illustrative embodiments, the cylindrical body 10 may be constructed of stainless-steel and the flotation tube may be composed of food-grade silicon rubber, with the thruster being of a propeller type driven by a submersible electric motor. In such an implementation, the device may be approximately 30 cm in diameter and weigh 3 Kg. Such an embodiment could easily be lifted and dropped into an open top fermentation bin or through a typical tank manway.

Figure 8:
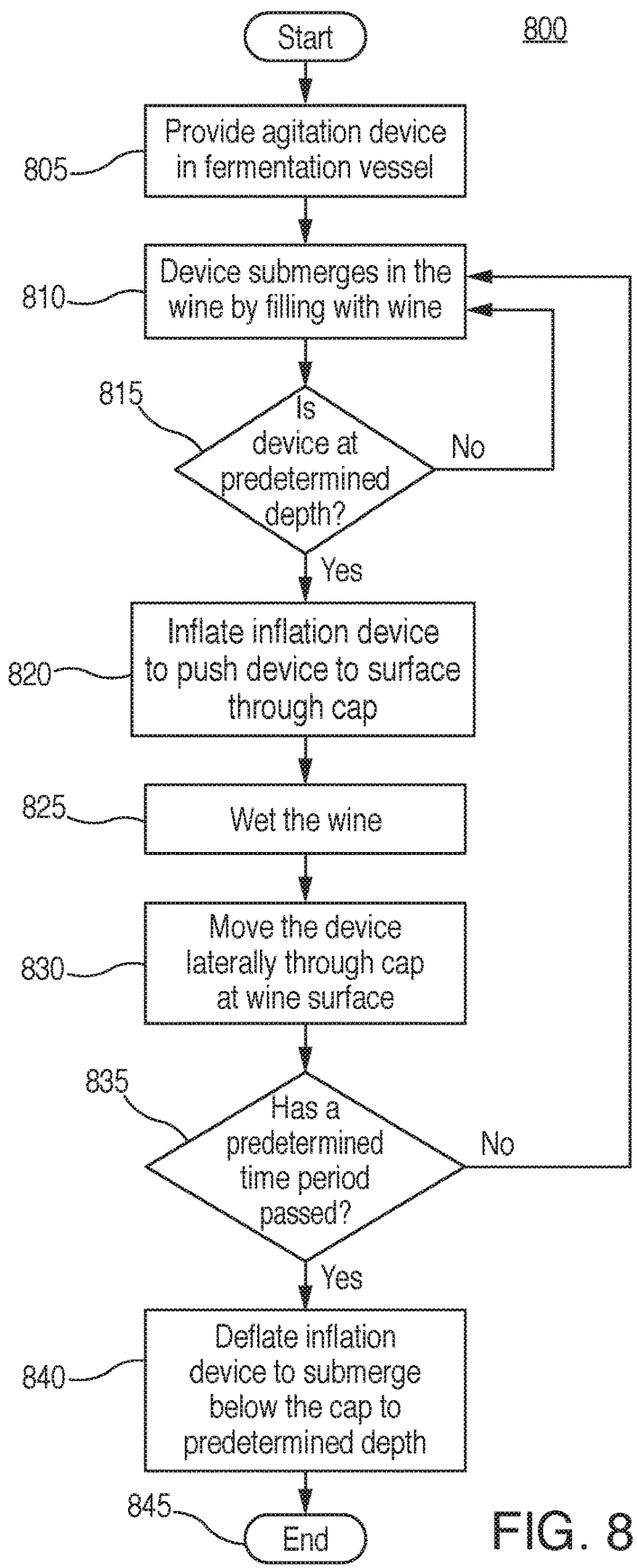
FIG. 8 is a flow chart illustrating a method of operation in accordance with a disclosed embodiment.

FIG. 8 illustrates a method of operation performed in accordance with the disclosed embodiments to break and wet the cap of a fermenting wine. As such, it should be understood that the components illustrated in FIG. 7 particularly and the remaining figures in general may cooperate under the control of the controller to perform the operations illustrated in FIG. 8.

As shown in FIG. 8 operations begin at 800 and control proceeds to 805, at which an agitation device is provided in the fermenting wine having a body with a plurality of holes that allow the device to fill with wine when submerged in the wine. Control then proceeds to 810, at which the device fills with wine to become submerged within the wine. Control then proceeds to 815, at which the device reaches a certain depth in the wine, thereby triggering inflation of an inflation device coupled to the body. This inflation thereby pushes the device to the surface so as to emerge through the cap at 820. Thereafter, at 825, wine in the body exits through the holes and wets the cap adjacent to the device. Optionally, the device may move laterally across the surface of the wine further breaking up portions of the cap in the path of the device 830. For example, the device may move laterally across the surface via the above mentioned thruster. After a predetermined period of time has passed, at 835, the inflation device is controlled to deflate sufficiently so that the device submerges below the cap and the surface of the wine. Thus, at 840, the device descends to a particular depth as a result of wine again entering the holes to fill the body of the device. The emerging and submerging cycle may be performed repeatedly at periodic intervals thereby continuously dispersing and wetting the cap until fermentation is complete 845.

Disclosed embodiments may also provide a mechanism for solving the conventional problem of accurately determining internal temperature within a fermentation vessel. Temperature is a very critical aspect in wine quality. Too low a temperature and the yeast cannot fully metabolize the sugar to ethanol. Too high a temperature results in off-flavors and aromas. The highest temperature is usually in the center of fermentation tank, but this is very difficult to measure because temperature probes can only be physically located close the tank walls. In accordance with at least one embodiment, a temperature sensor (not shown) may optionally be attached to the device 5 and be configured to determine an average temperature of the fermentation as the device travels around the tank. The agitation device with a temperature sensor enables temperature to be taken at a plurality of locations in the tank and an average temperature to be determined.

As explained herein, the disclosed embodiments provide technical utility and improvements over conventionally available cap management systems, devices and methodologies. The disclosed embodiments take advantage of the fact that it is very easy for buoyant forces to break up the cap by punching it from below. In a conventional punchdown technique, an arm or paddle is forced down through the cap breaking it up and pushing it into the fermenting wine below. This requires a significant support structure that the punchdown arm or paddle must be attached to. Moreover, it is very difficult and expensive to refit such a structure on to an existing fermentation vessel. Furthermore, conventional punchdown arms only punchdown in one spot and it is difficult to ensure that the entire cap is dispersed. More paddles or arms could be added but this further increases the cost and complexity.

Although the presently disclosed agitation device is described for use in fermentation of red wine, it is contemplated that the agitation device may be used in other fluidic systems where disruption of the surface or a cap at the surface is desired.

Though the presently disclosed embodiments have been described by way of a detailed description in which various aspects of the invention have been described, it will be seen by one skilled in the art that the full scope of the disclosed embodiments is not limited to the examples presented herein.

The invention claimed is:

1. An agitation device for breaking a fermenting cap comprising:
   a body having an open top and a closed base;
   a depth sensor coupled to the bottom of the body to determine the depth of the body below the surface of a fluid; and
   means for breaking up the fermenting cap in response to a determination that the body has reached a predetermined depth in the fluid beneath the cap.

2. The agitation device of claim 1, wherein the means for breaking up the fermenting cap comprises a flotation device coupled to an outer exterior of the body that inflates to move the body from the predetermined depth to the surface of the fluid breaking through the cap, and deflates to submerge the body below the fluid surface.

3. The agitation device of claim 2, wherein the means for breaking up the fermenting cap further comprises a thruster coupled to the closed base of the body that moves the body transversely across the surface of the fluid.

4. The agitation device of claim 3, wherein the thruster includes a motor and one of a jet or a propeller.

5. The agitation device of claim 1, wherein the body has a plurality of holes that communicate the fluid into and out of the body.

6. The agitation device of claim 1, further comprising support wires extending from a rim of the open top of the body and a flexible tubing that communicates with the means for breaking up the fermenting cap, wherein the support wires provide support to the flexible tubing that extends out of the open top.

7. The agitation device of claim 1, further comprising a temperature sensor.

8. An agitation system for breaking a fermenting cap comprising:
   an agitation device having a body and a depth sensor coupled to a base,
   a flotation device coupled around the exterior of the agitation device, and
   a controller coupled to the depth sensor configured to inflate the flotation device in response to receiving a signal from the depth sensor indicating a predetermined depth in a fermenting fluid has been reached, resulting in the agitation device surfacing in the fluid and breaking the fermenting cap on the surface of the fluid.

9. The agitation system of claim 8, wherein the agitation device further comprises a thruster that moves the agitation device transversely along the fluid surface, wherein the controller is configured to automatically activate and deactivate the thruster.

10. The agitation system of claim 9, wherein the controller is configured to automatically activate the thruster in response to a signal from the depth sensor that the agitation device is at the surface of the fluid.

11. The agitation system of claim 9, wherein the controller is configured to automatically deactivate the thruster after a predetermined period of time has elapsed.

12. The agitation system of claim 8, wherein the controller is configured to deflate the flotation device after a predetermined period of time has elapsed.

13. The agitation system of claim 8, further comprising a plurality of agitation devices in a plurality of fermenting vessels, wherein the controller is configured to automatically control emerging and submerging of each of the plurality of agitation devices.

14. The agitation system of claim 8, further comprising a solenoid valve coupled to an air source and the flotation device, wherein the controller de-energizes the solenoid and compressed air passes from the air source into the flotation device.

15. The agitation system of claim 14, wherein the controller re-energizes the solenoid and the valve vents air from the flotation device into the atmosphere.

16. The agitation system of claim 8, wherein the controller is configured to reinflate the flotation device in response to receiving a signal from the depth sensor indicating a predetermined depth in a fermenting fluid has been reached after a predetermined time has elapsed from a prior inflation.

* * * * *